United States Patent
Park

(10) Patent No.: US 7,556,588 B2
(45) Date of Patent: Jul. 7, 2009

(54) SYSTEM AND METHOD FOR GENERATING LINE PRESSURE OF CONTINUOUSLY VARIABLE TRANSMISSION IN HYBRID VEHICLE

(75) Inventor: Jong Jin Park, Suwon (KR)

(73) Assignee: Hyundai Motor Company, Seoul (KR)

(*) Notice: Subject to any disclaimer, the term of this patent is extended or adjusted under 35 U.S.C. 154(b) by 401 days.

(21) Appl. No.: 11/518,000

(22) Filed: Sep. 7, 2006

(65) Prior Publication Data

US 2007/0287593 A1 Dec. 13, 2007

(30) Foreign Application Priority Data

Jun. 13, 2006 (KR) .................. 10-2006-0053192

(51) Int. Cl.
  *B60W 10/06* (2006.01)
  *B60W 10/18* (2006.01)
(52) U.S. Cl. ............... 477/202; 477/204; 477/211; 477/218
(58) Field of Classification Search .............. None
See application file for complete search history.

(56) References Cited

U.S. PATENT DOCUMENTS 6,415,897 B1 * 7/2002 Sugimoto et al. ........... 188/353
7,125,085 B2 * 10/2006 Ohsaki et al. ............. 303/119.1
2004/0038774 A1 * 2/2004 Kuroda et al. ................ 477/3

FOREIGN PATENT DOCUMENTS

JP        2003-065100        3/2003

* cited by examiner

*Primary Examiner*—David D. Le
(74) *Attorney, Agent, or Firm*—Morgan, Lewis & Bockius LLP

(57) ABSTRACT

A system and a method for generating a line pressure of a continuously variable transmission (CVT) in a hybrid vehicle in which the line pressure of the CVT is maintained to be constant even in an idle stop state of an engine. Steps may include detecting operation of a brake; determining whether an idle stop condition is satisfied; detecting a hydraulic pressure of a control valve for controlling the line pressure of the continuously variable transmission when the idle stop condition is satisfied; comparing the hydraulic pressure of the control valve with a predetermined value; generating a pressure difference in the chamber when the hydraulic pressure of the control valve is smaller than or equal to the predetermined value; and actuating a cylinder for generating the line pressure according to the pressure difference in the chamber.

4 Claims, 2 Drawing Sheets

SYSTEM AND METHOD FOR GENERATING LINE PRESSURE OF CONTINUOUSLY VARIABLE TRANSMISSION IN HYBRID VEHICLE

CROSS-REFERENCE TO RELATED APPLICATION

This application claims priority to and the benefit of Korean Patent Application No. 10-2006-0053192 filed in the Korean Intellectual Property Office on Jun. 13, 2006, the entire contents of which are incorporated herein by reference.

BACKGROUND OF THE INVENTION (a) Field of the Invention

The present invention relates to a system and a method for generating line pressure for a continuously variable transmission (CVT) in a hybrid vehicle. More particularly, the present invention relates to a system and a method for generating line pressure for a CVT in a hybrid vehicle in which the line pressure of the CVT is maintained as constant even in an idle stop state of an engine.

(b) Description of the Related Art

A hybrid vehicle is a vehicle having both an engine for generating power by combusting a fuel and a motor for outputting power of a battery. A hybrid vehicle controls operation of the engine and the motor, and thus, a fuel consumption rate can be enhanced and a noise and an exhaust gas can be reduced.

In addition, a hybrid vehicle has a characteristic of performing power delivery when the engine is restarted in an idle stop state of the engine.

Two methods for generating the line pressure for the CVT in a hybrid vehicle are known. The first method generates the line pressure by receiving power from a power source of the engine when the engine is operated. The second method generates the line pressure by using an additional drive motor.

However, the line pressure of the CVT is generated after the engine is started according to such methods. Thus, exhaust performance and power performance may be deteriorated during a delay time for generating sufficient line pressure.

In addition, speed and torque differences between an input element and an output element may occur during the delay time for generating sufficient line pressure. Thus, an impact may occur when the engine is restarted in the idle stop state of the engine.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a system and a method for generating line pressure for a continuously variable transmission (CVT) in a hybrid vehicle having advantages of enhancing exhaust performance and power performance of the hybrid vehicle by maintaining the line pressure of the CVT at a predetermined value in an idle stop state of an engine.

Embodiments of the present invention also provide a system and a method for generating the line pressure of the CVT having further advantages of reducing a starting impact when the engine is restarted in the idle stop state of the engine.

An exemplary system for generating line pressure for a continuously variable transmission in a hybrid vehicle according to an embodiment of the present invention may include: a brake for generating a hydraulic pressure by operation of a brake pedal; an oil tank storing an oil; an oil pump for pumping the oil stored in the oil tank according to the hydraulic pressure generated by the brake; a hydraulic pressure supply line for supplying the hydraulic pressure from the oil pump to the transmission; a hydraulic pressure withdrawal line connected to the hydraulic pressure supply line, and having a control valve for controlling the hydraulic pressure thereof; a transmission control unit for controlling opening and closing of the control valve; and a line pressure generating unit connected to the hydraulic pressure supply line, and generating the line pressure in an idle stop state.

The line pressure generating unit may include: a chamber divided into first and second portions by a diaphragm; a valve connected to the first portion of the chamber; and a cylinder for generating the line pressure in accordance with a pressure difference between the first and second portions of the chamber.

The second portion of the chamber may be connected to the brake and a pressure thereof may be maintained to be the same as a negative pressure of an engine.

A vacuum tank may be connected between the second portion of the chamber and the brake, and a pressure of the vacuum tank may be maintained to be the same as the negative pressure of the engine.

In addition, an exemplary system for generating the line pressure according to an embodiment of the present invention may further include: an acceleration pedal sensor for detecting operation of an acceleration pedal; and a hybrid control unit connected to the acceleration pedal sensor and controlling opening and closing of the valve.

The hybrid control unit may be connected to the transmission control unit, and may open the valve when the hydraulic pressure of the control valve is smaller than or equal to a predetermined value in the idle stop state.

An exemplary method for generating line pressure for a continuously variable transmission (CVT) in a hybrid vehicle by using a system for generating the line pressure of the CVT in the hybrid vehicle that generates the line pressure according to a pressure difference in a chamber divided into first and second portions may include: detecting operation of a brake; determining whether an idle stop condition is satisfied; and generating the line pressure when the idle stop condition is satisfied.

The generation of the line pressure may include: detecting a hydraulic pressure of a control valve for controlling the line pressure of the continuously variable transmission; comparing the hydraulic pressure of the control valve with a predetermined value; generating the pressure difference in the chamber when the hydraulic pressure of the control valve is smaller than or equal to the predetermined value; and actuating a cylinder for generating the line pressure according to the pressure difference in the chamber.

The generation of the pressure difference in the chamber may include: maintaining a pressure of the second portion of the chamber to be the same as a negative pressure of an engine; and opening a valve in order for a first portion of the chamber to have the same pressure as the atmosphere.

An exemplary method for generating the line pressure may further include: determining whether the engine is restarted;

closing the valve when the engine is restarted; and operating an oil pump for pumping an oil.

DETAILED DESCRIPTION OF THE PREFERRED EMBODIMENTS

Exemplary embodiments of the present invention will hereinafter be described in detail with reference to the accompanying drawings.

Figure 1:
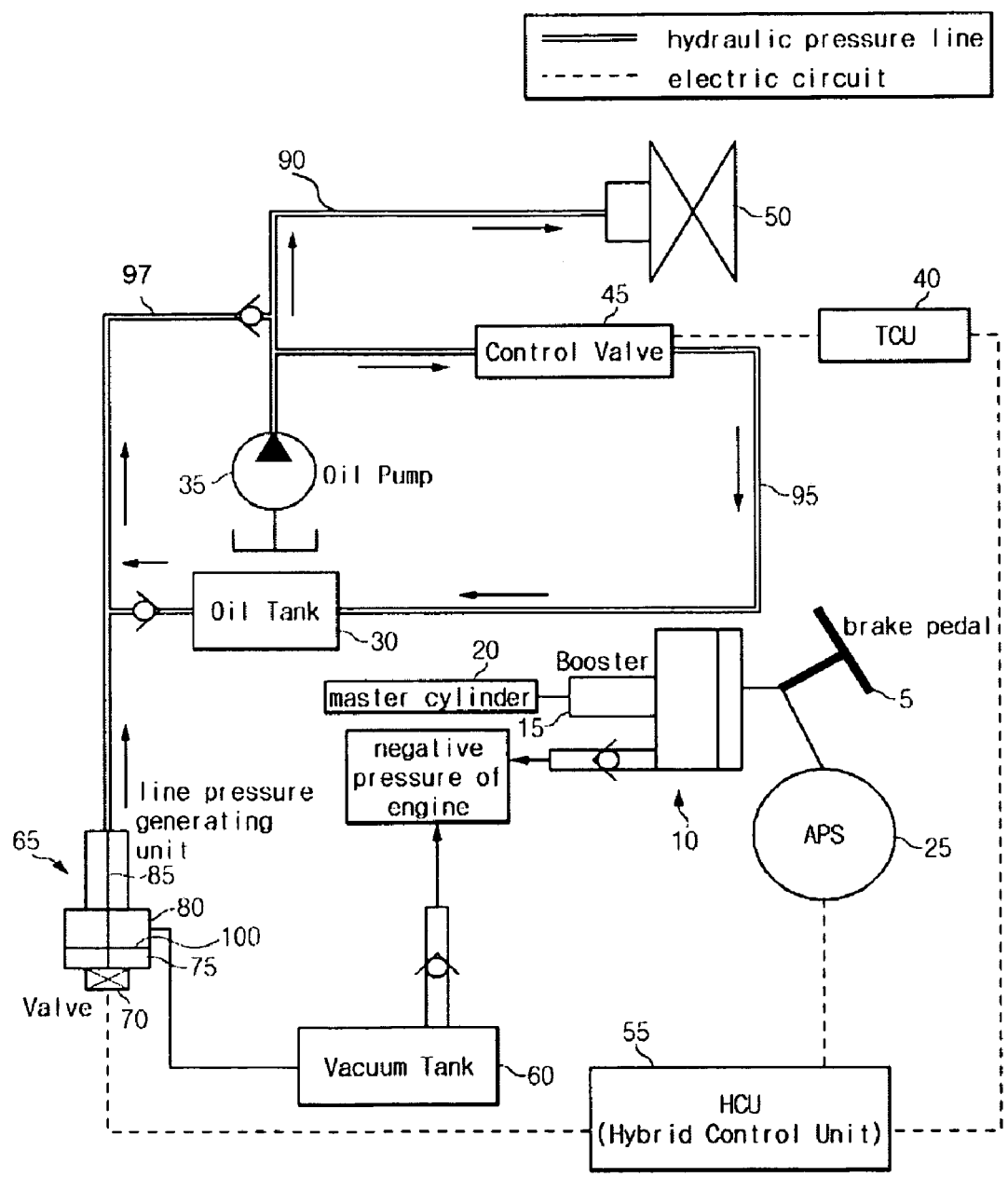
FIG. 1 is a schematic diagram of an exemplary system for generating a line pressure for a continuously variable transmission in a hybrid vehicle according to one embodiment of the present invention.

As shown in FIG. 1, an exemplary system for generating line pressure for a continuously variable transmission (CVT) in a hybrid vehicle according to an embodiment of the present invention includes a brake 10, an oil tank 30, an oil pump 35, a transmission control unit 40, a line pressure generating unit 65, and a hybrid control unit 55.

The oil pump 35 is connected to a transmission 50 via a hydraulic pressure supply line 90. A hydraulic pressure withdrawal line 95 is connected to the hydraulic pressure supply line 90 and the oil tank 30. The brake 10 generates a hydraulic pressure in accordance with operation of a brake pedal 5. The brake 10 includes a booster 15 and a master cylinder 20 for amplifying the hydraulic pressure. The oil tank 30 stores oil. The oil tank 30 is connected to the oil pump 35 and supplies the oil to the transmission 50.

The oil pump 35 pumps the oil stored in the oil tank 30 in accordance with the hydraulic pressure generated in the brake 10. In addition, the oil pumped by the oil pump 35 is supplied to the transmission 50 via the hydraulic pressure supply line 90.

If an engine stops or is an idle stop state, the oil pump 35 stops, accordingly, and the oil is withdrawn via the hydraulic pressure withdrawal line 95.

In addition, a control valve 45 is mounted on the hydraulic pressure withdrawal line 95. The control valve 45 controls hydraulic pressure of the hydraulic pressure supply line 90 and the hydraulic pressure withdrawal line 95.

The transmission control unit 40 can be realized by one or more processors activated by a predetermined program. The processor and program, as well as memory and other associated hardware and software may be selected and programmed by persons of ordinary skill in the art based on the teachings of the present invention contained herein. The transmission control unit 40 controls operation of the transmission 50. In addition, the transmission control unit 40 is connected to the control valve 45 and controls opening and closing of the control valve 45. The transmission control unit 40 is connected to the hybrid control unit 55, and transmits the hydraulic pressure information of the control valve 45 to the hybrid control unit 55.

The line pressure generating unit 65 is connected to a second hydraulic pressure supply line 97 and generates the line pressure of the CVT in the idle stop state of the engine. The line pressure generating unit 65 includes a chamber 105, a valve 70, and a plunger 85.

The chamber 105 is divided into first and second portions by a diaphragm 100. The valve 70 is connected to the first portion 75 of the chamber 105, and a vacuum tank 60 is connected to the second portion 80 of the chamber 105.

The valve 70 is opened and closed in accordance with a control signal of the hybrid control unit 55. In the case that the valve 70 is opened, a pressure of the first portion 75 of the chamber 105 is maintained to be the same as an atmospheric pressure. On the contrary, in the case that the valve 70 is closed, the pressure of the first portion 75 of the chamber 105 is the same as a negative pressure of the engine.

The vacuum tank 60 is connected to the brake 10, and the pressure of the vacuum tank 60 is the same as the negative pressure of the engine. Therefore, a pressure of the second portion 80 of the chamber 105 connected to the vacuum tank 60 is the same as the negative pressure of the engine.

In the case that the valve 70 is opened, the plunger 85 coupled to the diaphragm 100 is operated by the pressure difference between the first and second portions 75 and 80 of the chamber 105, and generates the line pressure of the CVT. However, in the case that the valve 70 is closed, the first and second portions 75 and 80 of the chamber 105 have the same pressure, and thus the plunger 85 is not operated.

The hybrid control unit 55 can be realized by one or more processors activated by a predetermined program, and the predetermined program can be programmed to perform each step of a method for generating the line pressure of the continuously variable transmission in a hybrid vehicle according to an embodiment of this invention. Memory and other associated hardware and software as may comprise the hybrid control unit 55 may be selected and programmed by persons of ordinary skill in the art based on the teachings of the present invention as contained herein.

The hybrid control unit 55 is connected to the valve 70 and controls opening and closing of the valve 70. In addition, the hybrid control unit 55 is connected to an acceleration pedal sensor (APS) 25, and detects operation of the acceleration pedal (not shown). The hybrid control unit 55 determines whether a restarting condition of the engine is satisfied.

In addition, the hybrid control unit 55 is connected to the transmission control unit 40, and receives a pressure signal of the control valve 45. In addition, the hybrid control unit 55 compares the hydraulic pressure of the control valve 45 with a predetermined value.

If the hydraulic pressure of the control valve 45 is smaller than or equal to the predetermined value, the hybrid control unit 55 opens the valve 70 and generates the pressure difference in the chamber 105. Therefore, the plunger 85 is operated in accordance with the pressure difference in the chamber 105 and generates the line pressure of the CVT.

Figure 2:
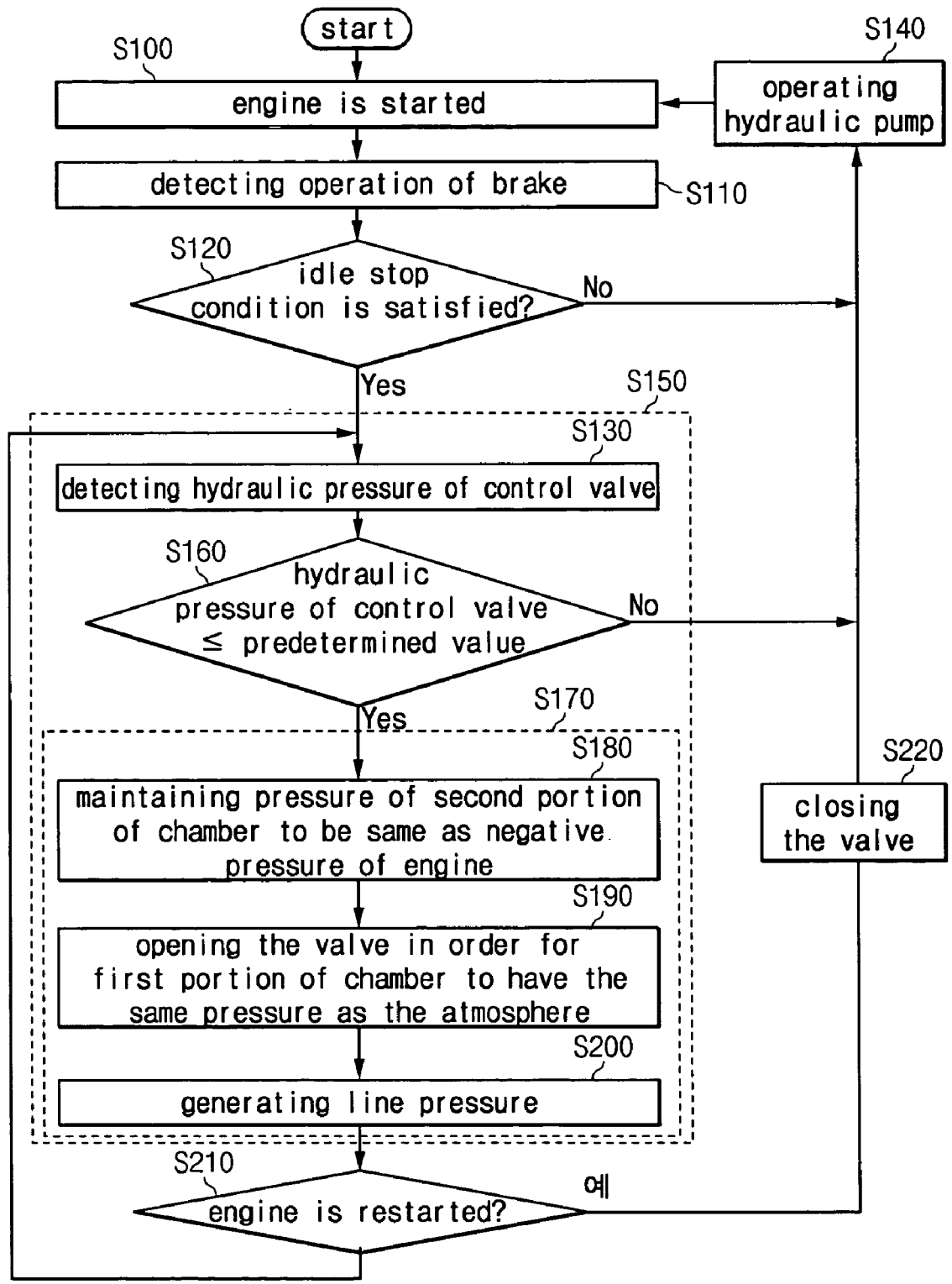
FIG. 2 is a flowchart of an exemplary method for generating a line pressure for a continuously variable transmission in a hybrid vehicle according to one embodiment of the present invention.

Hereinafter, referring to the accompanying drawings and particularly FIG. 2, an exemplary method for generating the line pressure of the CVT in a hybrid vehicle according to an embodiment of the present invention will be described in detail.

When the engine is operated at step S100, the hybrid control unit 55 detects the operation of the brake 10 at step S110. If the brake 10 is operated, the hybrid control unit 55 determines whether the idle stop condition is satisfied at step S120. The idle stop condition may be determined to be satisfied when the speed of the vehicle is less than a predetermined speed (generally about 5 km/h), the position of a gear is in a neutral state, and the brake and clutch have been manipulated.

If an idle stop condition is not satisfied, the transmission control unit 40 operates the oil pump 35 and controls the hydraulic pressure of the hydraulic pressure supply line 90 and the hydraulic pressure withdrawal line 95 at step S140. If the idle stop condition is satisfied, the hybrid control unit 55 generates the line pressure of the CVT at step S150.

At the step S150, the transmission control unit 40 detects the hydraulic pressure of the control valve 45 at step S130, and the hybrid control unit 55 compares the hydraulic pressure of the control valve 45 with a predetermined value at step S160. The predetermined value is a pressure that is needed when the engine starts or restarts, and can be understood by a person of an ordinary skill in the art based on the teachings contained herein.

If the hydraulic pressure of the control valve 45 is smaller than or equal to the predetermined value, the hybrid control unit 55 generates a pressure difference in the chamber 105 at step S170.

At the step S170, the pressure of the second portion 80 of the chamber 105 connected to the brake 10 is maintained to be the same as the negative pressure of the engine at step S180. At this time, the hybrid control unit 55 opens the valve 70, and so the pressure of the first portion 75 of the chamber 105 is the same as the atmospheric pressure at step S190.

In this case, the first portion 75 of the chamber 105 has a different pressure from the second portion 80 of the chamber 105. Therefore, the plunger 85 is operated in accordance with the pressure difference in the chamber 105. Accordingly, the line pressure of the CVT is generated at step S200. After that, the hybrid control unit 55 determines whether the engine is restarted at step S210.

If the engine is restarted, the hybrid control unit 55 closes the valve 70 and makes the pressure of the first portion 75 of the chamber 105 be the same as the negative pressure of the engine at step S220. In this case, the hybrid control unit 55 stops the operation of the plunger 85. After that, the transmission control unit 40 operates the oil pump 35, and the hydraulic pressure is supplied to the transmission 50 at step S140.

As described above, the line pressure of the CVT is generated in the idle stop state of the engine according to the present invention. Therefore, exhaust performance and power performance are improved according to the present invention. In addition, the restarting impact is reduced according to the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for generating a line pressure of a continuously variable transmission in a hybrid vehicle, comprising:
   a brake for generating a hydraulic pressure by operation of a brake pedal;
   an oil tank for storing oil;
   an oil pump for pumping oil stored in the oil tank according to the hydraulic pressure generated by the brake;
   a hydraulic pressure supply line for supplying the hydraulic pressure from the oil pump to the transmission;
   a hydraulic pressure withdrawal line connected to the hydraulic pressure supply line, and having a control valve for controlling the hydraulic pressure thereof;
   a transmission control unit for controlling opening and closing of the control valve; and
   a line pressure generating unit connected to the hydraulic pressure supply line, and generating the line pressure in an idle stop state,
   wherein the line pressure generating unit comprises:
   a chamber divided into first and second portions by a diaphragm;
   a valve connected to the first portion of the chamber; and
   a plunger for generating the line pressure in accordance with a pressure difference between the first and second portions of the chamber,
   wherein the second portion of the chamber is connected to the brake and a pressure thereof is maintained to be the same as a negative pressure of an engine, and
   wherein a vacuum tank is connected between the second portion of the chamber and the brake, and a pressure of the vacuum tank is maintained to be the same as the negative pressure of the engine.

2. The system of claim 1, further comprising:
   an acceleration pedal sensor for detecting operation of an acceleration pedal; and
   a hybrid control unit connected to the acceleration pedal sensor and controlling opening and closing of the valve.

3. The system of claim 2, wherein the hybrid control unit is connected to the transmission control unit, and opens the valve when the hydraulic pressure of the control valve is smaller than or equal to a predetermined value in the idle stop state.

4. A method for generating line pressure for a continuously variable transmission in a hybrid vehicle by using a system for generating the line pressure based on a pressure difference in a chamber divided into first and second portions, the method comprising:
   detecting operation of a brake to initiate line pressure generation;
   determining whether an idle stop condition is satisfied; and
   generating the line pressure when the idle stop condition is satisfied,
   wherein the generation of the line pressure comprises:
   detecting a hydraulic pressure of a control valve for controlling the line pressure of the continuously variable transmission;
   comparing the hydraulic pressure of the control valve with a predetermined value;
   generating the pressure difference in the chamber when the hydraulic pressure of the control valve is smaller than or equal to the predetermined value; and
   actuating a plunger for generating the line pressure according to the pressure difference in the chamber; and
   wherein the generation of the pressure difference in the chamber comprises:
   maintaining a pressure of the second portion of the chamber to be the same as a negative pressure of an engine;
   opening a valve in order for a first portion of the chamber to have the same pressure as the atmosphere;
   determining whether the engine is restarted;
   closing the valve when the engine is restarted; and
   operating an oil pump for pumping an oil.

* * * * *